United States Patent [19]

Poganiuch et al.

[11] Patent Number: 6,024,890
[45] Date of Patent: Feb. 15, 2000

[54] FERROMAGNETIC PIGMENTS

[75] Inventors: Peter Poganiuch; Ekkehard Schwab, both of Neustadt; Wilma M. Dausch, Limburgerhof; Reinhard Körner, Frankenthal; Werner Wimbersky, Ludwigshafen, all of Germany

[73] Assignee: EMTEC Magnetics GmbH, Ludwigshafen, Germany

[21] Appl. No.: 09/101,557

[22] PCT Filed: Jan. 9, 1997

[86] PCT No.: PCT/EP97/00062

§ 371 Date: Jul. 13, 1998

§ 102(e) Date: Jul. 13, 1998

[87] PCT Pub. No.: WO97/26666

PCT Pub. Date: Jul. 24, 1997

[30] Foreign Application Priority Data

Jan. 17, 1996 [DE] Germany .................. 196 01 412

[51] Int. Cl.[7] ................ H01F 1/06; G11B 5/706
[52] U.S. Cl. ............... 252/62.58; 252/62.55; 252/62.56; 252/62.59; 252/62.6; 252/62.57; 252/62.64; 428/403; 428/404; 428/692; 428/570; 106/403; 106/457; 106/459
[58] Field of Search ................. 106/403, 457, 106/459; 428/403, 404, 692, 570; 252/62.55, 62.56, 62.57, 62.58, 62.59, 62.6, 62.64

[56] References Cited

U.S. PATENT DOCUMENTS

| | | | |
|---|---|---|---|
| 2,879,154 | 3/1959 | Campbell | 75/5 |
| 4,050,962 | 9/1977 | Koester et al. | 148/105 |
| 4,133,677 | 1/1979 | Matsui et al. | 75/5 |
| 4,165,232 | 8/1979 | Jaeckh et al. | 75/5 |
| 4,305,753 | 12/1981 | French | 75/5 |
| 4,560,544 | 12/1985 | Nakata et al. | 423/266 |
| 4,933,004 | 6/1990 | Hoppe et al. | 75/349 |
| 5,151,115 | 9/1992 | Tamai | 75/348 |
| 5,466,306 | 11/1995 | Mishima et al. | 148/306 |
| 5,645,652 | 7/1997 | Okinaka et al. | 428/570 |

FOREIGN PATENT DOCUMENTS

| | | |
|---|---|---|
| 056257 | 7/1982 | European Pat. Off. . |
| 615231 | 9/1994 | European Pat. Off. . |
| 5214413 | 8/1993 | Japan . |
| 2063845 | 6/1981 | United Kingdom . |

OTHER PUBLICATIONS

Jorgensen, "The Complete Handbook of Magnetic Recording", 3rd. Ed., 1988, pp. 310–311. no month.

Auweter et al., *IEEE Transactions on Magnetics*, vol. 27, No. 6, Nov. 1991, pp. 4669–4671.

Williams et al., AIP Conf. Proc. 5, pp. 738–742, 1971. no month.

*Primary Examiner*—C. Melissa Koslow
*Attorney, Agent, or Firm*—Keil & Weinkauf

[57] ABSTRACT

The present invention relates to phosphorus-containing ferromagnetic pigments comprising, in particular, from 30 to 70% by volume of a core, said core comprising essentially iron and cobalt, and from 30 to 70% of a shell, said shell comprising essentially aluminum, phosporus, silicon, oxygen, and optionally magnesium and sodium; the invention further relates to a process for preparation of said pigments, their use in magnetic recording materials and magnetic recording materials which contain such pigments.

18 Claims, No Drawings

FERROMAGNETIC PIGMENTS

The present invention relates to phosphorus-containing ferromagnetic pigments containing in particular a core comprising essentially iron and cobalt, a process for their preparation, their use in magnetic recording materials and magnetic recording materials which contain such pigments.

With increasing storage density of magnetic recording materials, the pigments to be used in these materials are having to meet higher and higher requirements. Owing to the higher specific magnetization compared with oxide materials, metallic iron particles, which may also be doped with nickel or cobalt, have become established for high-density magnetic recording (for example in the V8 system). However, in addition to good magnetic properties, in particular the length and the volume of the pigment particles are of primary importance. The signal/noise ratio of the magnetic recording material increases in proportion to the square root of the number of particles contained in a volume element (Finn Jorgensen, The complete Handbook of Magnetic Recording, 3rd Ed., Tob Books Inc., Summit 1988). It is also known that the average particle length of the particles used in a magnetic recording material may not exceed one third of the recording wavelength without signal losses occurring (Auweter et al., IEEE, Vol. 27(1991), 4669–4671). Magnetic particles for the 8 mm video system having a recording wavelength of 0.58 μm therefore may on average be no longer than 195 nm, while those for the Hi8 system (0.4 μm recording wavelength) may not be longer than 130 nm. Particles having a length of from 50 to 100 nm are required for novel, digital video systems for high-density recording. Thus, finely divided and short magnetic particles which nevertheless must have a high coercive force and be readily dispersible are required for high-density magnetic recording. However, the more finely divided magnetic particles there are, the more difficult is homogeneous dispersing (Jorgensen, loc cit, page 310). It is very important that the particles are not agglomerated by sintering or that the particle surface has many anchor groups for the dispersants, permitting homogeneous dispersion of the particles in the binder system.

Ferromagnetic iron pigments are known and are obtained, inter alia, if acicular iron oxide compounds, for example the oxides or oxide hydroxides, in particular iron (III) oxide hydroxides, such as α-FeOOH, coated with a cobalt compound, are reduced with hydrogen or other gaseous reducing agents.

The good magnetic properties of such pigments are based essentially on the anisotropic shape of the particles, i.e. the acicular shape of the particles. To minimise the loss of shape occurring during conversion of the acicular iron oxide compounds coated with a cobalt compound and to avoid sintering, the particles are provided with a shape-stabilizing coating prior to this conversion.

For example, acicular cobalt-containing, ferromagnetic iron pigments can be obtained according to DE-A 39 11 039, but said iron pigments disadvantageously have a length of from 250 to 500 μm and cannot be used for high-density magnetic recordings.

The synthesis of α-FeOOH can be carried out by the acidic process (DE-A 36 03 431). The starting material used here is an aqueous iron(II) salt solution, to which further ions are added if required (DE-A 32 43 868). The geometry of the FeOOH particles can be influenced by the addition of these foreign ions. Some of the iron(II) ions are precipitated with alkali at the beginning of the synthesis. This is followed by oxidation, for example by passing in air, to give α-FeOOH. The protons thus liberated are first trapped by the dissolving iron(II) hydroxide precipitate so that the pH does not fall below 5. Once the iron(II) hydroxide precipitate has completely dissolved, the pH decreases sharply and the formation of α-FeOOH comes virtually to a stop. This first part is referred to as the nucleation phase. The iron(II) ions present in solution are then oxidized with an oxidizing agent, e.g. air, with simultaneous addition of alkali to give iron(III), which grows on the nuclei present (growth phase). After the end of the synthesis, the α-FeOOH is coated with a cobalt compound (DE-A 39 11 039). The particles are then provided with a shape-stabilizing coating. The use of phosphates (U.S. Pat. No. 4,305,753), phosphates and borates (DE-A 27 43 298), phosphates and zinc (DE-A 36 03 431), alkaline earth metal compounds in combination with carboxylic acids (DE-A 24 34 096) and compounds of silicon and/or of aluminum (EP-A 56 257, DE-A 30 44 772, U.S. Pat. No. 4,133,677) has been proposed for this purpose. Coated α-FeOOH is then usually first dehydrated to give coated α-$Fe_2O_3$. The reduction of the resulting particles is usually carried out by means of gaseous reducing agents, generally hydrogen (U.S. Pat. No. 2,879,154).

The combined coating with silicon and aluminum is particularly advantageous since the pigment is thus coated with a ceramic protective layer. Furthermore, both acidic Si—OH and basic Al—OH groups are thus present on the surface, so that acidic as well as basic dispersants can interact readily with the surface.

On the other hand, aluminum has the disadvantage of impeding the reduction of the iron oxide particles (EP-A 615 231) and thus adversely affecting the magnetic properties. Consequently, reduction must be carried out at relatively high temperatures, the result being that the particles agglomerate due to sintering. This cancels out the advantages of the mixed Si/Al coating.

The reduction of iron oxide to ferromagnetic metal particles can be carried out particularly advantageously in a fixed-bed reactor as proposed in EP-A-56 257. However, a fine powder cannot be reduced in a fixed-bed reactor because a reducing agent, such as hydrogen, cannot flow uniformly through the bed present in such a reactor. The possibility of converting α-FeOOH needles into extrudates or granulates of from 2 to 10 mm diameter is therefore a precondition for the reduction in a fixed-bed reactor. EP-A 56 257 therefore proposes cutting sheets of moist α-FeOOH filter cake into pieces measuring 10×10×5 $mm^3$ and then drying them. However, this process is too expensive and technically very complex.

The shaping of the moist filter cake can advantageously be carried out by means of an extrusion press, a paste granulator or an extruder.

However, moist filter cakes comprising silica-coated, finely divided particles exhibit the phenomenon of thixotropy. Hence, extrusion of such filter cakes with the stated apparatuses presents considerable problems.

It is an object of the present invention to provide ferromagnetic pigments having a length of not more than 195 nm, good dispersibility, a high coercive force, high magnetization and high corrosion stability in a technically simple and economical manner.

We have found that this object is achieved by ferromagnetic, iron- and cobalt-containing pigments containing from 1 to 5 mol of aluminum, from 3 to 10 mol of silicon, from 0.7 to 3.5 mol of phosphorus and oxygen, per 100 mol of the molar sum of iron and cobalt, wherein the sum of the amounts by weight of the elements iron, cobalt, aluminum, silicon, phosphorus and oxygen is from 95 to 100% by weight, based on the total weight of the pigments, a process for the preparation of such pigments, the use of the pigments for the production of magnetic recording materials and magnetic recording materials which contain such pigments.

For the preparation of the α-FeOOH nuclei, according to the invention a solution containing iron(II) ions, in particular an aqueous solution, is first converted into iron(II) hydroxide in the presence of phosphate ions with a substoichiometric amount, based on the complete precipitation of iron(II) hydroxide, of a basic alkali metal compound.

The iron(II) compounds used may be iron(II) salts of a preferably inorganic acid, such as perchloric acid or sulfuric acid.

The phosphate ions can preferably be used in the form of inorganic compounds such as phosphoric acid and its salts, such as $NaH_2PO_4$, $Na_2HPO_4$, or $KH_2PO_4$, and in the form of the corresponding oligomeric phosphates and phosphoric acids.

Suitable basic alkali metal compounds are organic and preferably inorganic salts, such as carbonates, oxides and in particular hydroxides of the alkali metals.

The iron(II) salt solution should advantageously have a concentration of iron(II) ions of from 0.5 to 1.4, preferably from 0.8 to 1.3, mol/l.

The phosphate ions should advantageously be added to the iron(II) salt solution in particular in aqueous solution so that, in the ferromagnetic pigments, the amount of phosphorus is at least 0.7, and not more than 3.5 mol per 100 mol of the sum of iron and cobalt. The parameters required for this purpose can readily be determined by a few simple preliminary experiments. If the amount of phosphorus is smaller, only coarse-particled, nonuniform α-FeOOH with dendrites is obtained, from which it is possible to prepare only coarse metal particles agglomerated by sintering and having lengths of more than 200 nm, the coercive force Hc being not greater than 115 kA/m. Such pigments are unsuitable for high-density recording. If this amount of phosphorus is larger, the α-FeOOH particles are too small. The coercive force of magnetic pigments prepared therefrom is too low for high-density recording.

The basic alkali metal compound advantageously and in particular as an aqueous solution, may be added to this solution while stirring, in an amount which is sufficient to precipitate from 30 to 80, in particular from 50 to 60% of the iron(II) ions in the form of iron(II) hydroxide, and said aqueous solution should have an alkali metal ion concentration of from 2 to 6, in particular from 3 to 5, mol/l.

The precipitation reaction should be carried out preferably at from 20 to 65° C., in particular from 40 to 60° C.

According to the invention, an oxidation is then carried out at from 20 to 65° C., in particular from 40 to 60° C., until the pH falls below 4, followed by a further oxidation of from 50 to 80° C., in particular from 60 to 80° C., the pH being prevented from falling below 4 by adding basic compounds.

Suitable oxidizing agents are solid, liquid and, preferably, gaseous oxidizing agents, in particular gases containing molecular oxygen, such as air.

The α-iron oxide hydroxide particles obtained are then impregnated with a cobalt(II) compound, the latter being added as such or advantageously in the form of, in particular, an aqueous solution.

Cobalt(II) salts of an organic acid, such as formic acid or acetic acid, preferably of an inorganic acid, such as hydrochloric acid, perchloric acid or sulfuric acid, may be used as the cobalt(II) compound.

According to the invention, by adding basic compounds, preferably the stated basic alkali metal compounds, a pH of from 7 to 10 is established so that cobalt hydroxide is precipitated onto the iron oxide particles.

The amount of cobalt(II) ions should advantageously be such that the amount of cobalt in the ferromagnetic pigments is at least 5 and not more than 20 mol per 100 mol of the sum of iron and cobalt. If the amount of cobalt is less than 5 mol, stable metal pigments are not obtained. If the amount is greater, cobalt hydroxide is no longer attracted to the pigment and instead separate cobalt hydroxide phases form.

According to the invention, an alkali metal silicate solution, in particular sodium silicate solution, is then added, preferably while stirring, at from 20 to 80° C., preferably from 35 to 50° C. The amount of alkali metal silicate solution should be such that the amount of silicon in the ferromagnetic pigments is from 3 to 10 mol per 100 mol of the sum of iron and cobalt.

The α-iron oxide hydroxide particles are then treated with an aluminum compound, which should advantageously be added in the form of, in particular, an aqueous solution.

Aluminum salts of an organic acid, such as formic acid or acetic acid, preferably of an inorganic acid, such as hydrochloric acid, perchloric acid or sulfuric acid, may be used as the aluminum compound.

According to the invention, by adding basic compounds, preferably the stated basic alkali metal compounds, the pH of from 6 to 10 is established so that aluminum hydroxide is precipitated onto the iron oxide particles.

The precipitation reaction should advantageously be carried out at from 20 to 80° C., in particular from 35 to 50° C.

The amount of aluminum(III) ions should be such that the amount of aluminum in the ferromagnetic pigments is from 1 to 5 mol per 100 mol of the sum of iron and cobalt.

According to the invention, the total amount of aluminum and silicon is such that the molar sum of the amounts of aluminum and silicon is from 4 to 13 mol per 100 mol of the molar sum of iron and cobalt. If the amount is less than 4 mol, sufficient protection from sintering is not achieved and the particles agglomerate by sintering during dehydration and reduction. If the amount is greater than 13 mol, the magnetization of the resulting ferromagnetic particles is too low. The ratio of silicon to aluminum should be at least 1. If the ratio is less than 1, the reduction is impeded and particles having a coercive force greater than 115 kA/m, which are required for high-density magnetic recording, are not obtained.

The α-FeOOH particles coated with cobalt hydroxide, silica and aluminum hydroxide can then be treated with an assistant to prevent thixotropy.

Particularly suitable assistants are magnesium salts of an organic acid, such as acetic acid, preferably of an inorganic acid, such as hydrochloric acid, perchloric acid or sulfuric acid.

The magnesium should advantageously be added in the form of, in particular, an aqueous salt solution, the molar ratio of the added magnesium ions to the iron(II) ions preferably being at least 5:100. If less magnesium is used, the thixotropic behaviour of the α-FeOOH filter cake is not prevented. For the treatment of magnesium, a pH of 6–8, preferably 6.5 to 7.5, should be established. If the pH is less than 6, the precipitated cobalt hydroxide begins to dissolve again; if the pH is greater than 8, some of the added magnesium is precipitated as magnesium hydroxide onto the α-FeOOH. If the ferromagnetic pigment contains more than 1 mol of magnesium per 100 mol of the molar sum of iron and cobalt, the good magnetic properties are eliminated.

After the treatment with magnesium, the suspension containing the coated α-FeOOH particles is, according to the invention, filtered and washed, and the opposite ions of the elements precipitated onto the particles, but in particular the magnesium ions added as an assistant, should preferably be washed out to such an extent that not more than 1 mol of magnesium remains for 100 mol of the molar sum of iron and cobalt in the pigment.

The remaining α-FeOOH filter cake can then readily be processed to give extrudates in apparatuses usually used for this purpose, such as paste granulators, extrusion presses or extruders.

After drying, the extrudates should preferably have an average thickness of from 2 to 10 mm.

In addition to the elements iron, cobalt, aluminum, silicon, phosphorus, oxygen and, if required, magnesium, of which the novel pigments preferably contain from 95 to 100, in particular from 98 to 100, % by weight, said pigments may advantageously contain further elements or compounds of elements, such as alkali metals, in particular sodium, transition metals, in particular manganese, yttrium or lanthanum, or lanthanides, in particular neodymium, and mixtures of such elements or compounds of such elements.

Such elements or compounds of such elements may be added in any of the reactions described.

Alkali metals, in particular sodium, can be used in the precipitation of iron(II) hydroxide advantageously in the form of basic alkali metal compounds, such as organic and, preferably, inorganic salts, such as carbonates, oxides and in particular hydroxides of alkali metals, for example sodium hydroxide, or, in the case of the addition of silicon, in the form of alkali metal silicates, in particular sodium silicates, such as sodium metasilicate (waterglass).

Sodium converts some of the acidic Si—OH groups present on the surfaces into Si—O—Na groups, which are alkaline. In this way, it is possible to establish a slightly basic pH of the pigment in spite of the low aluminum content in the outer protective layer, which pH is advantageous for dispersing with dispersants which carry in particular acidic groups, such as carboxylate, sulfonate or phosphonate groups.

The sodium content should preferably be not more than 1 mol and not less than 0.02 mol per 100 mol of the molar sum of iron and cobalt.

Suitable transition metal compounds, in particular manganese compounds or yttrium compounds, lanthanum compounds or lanthanide compounds, in particular neodymium compounds, are the relevant metal salts of an organic acid, such as acetic acid or formic acid, preferably of an inorganic acid, such as hydrochloric acid, perchloric acid or sulfuric acid.

According to the invention, the particles are then heated at from 700 to 850° C., in particular from 750 to 820° C., to convert the α-FeOOH into α-$Fe_2O_3$, so that reaction times of from 45 to 90 minutes result, and are then reacted with a reducing gas, preferably hydrogen, at from 380 to 520° C., in particular from 400 to 480° C., resulting in reaction times of from 5 to 20 hours. The two reactions can be carried out in apparatuses known per se for such reactions, such as rotary kilns, preferably fixed-bed reactors.

According to the invention, the particles are then passivated by reaction with a solid, liquid or, preferably, gaseous oxidizing agent, in particular with a gas containing molecular oxygen, such as air or preferably a mixture of air and nitrogen.

Depending on the preparation process, the novel pigments comprise from 30 to 70% by volume of a core, which essentially consists of iron and cobalt, and from 30 to 70% by volume of a shell, which essentially consists of aluminum, phosphorus, silicon and oxygen and, if required, magnesium and/or sodium.

The acicular pigments should advantageously have an average length of 50 to 195 nm, in particular from 60 to 160 nm, needle lengths of, preferably, from 130 to 180 nm being recommended for magnetic recording media which are particularly suitable for analog video recordings and needles lengths of, preferably, from 50 to 100 nm being recommended for those which are particularly suitable for digital video recordings, a ratio of the average length to the average needle width of from 3:1 to 9:1, in particular from 4:1 to 8:1, and a specific surface area (SSA), determined according to DIN 66132, of from 40 to 65, in particular from 45 to 55, $m^2/g$. The conditions for establishing the needle geometry optimum for the respective application can be readily determined by a few simple preliminary experiments.

The novel pigments have good ferromagnetic properties. The coercive force Hc at a mean tap density of 0.95 $g/cm^3$ is at least 115 kA/m and the magnetization Mm is at least 135 $nTm^3/g$ in a magnetic field of 400 kA/m and at least 140 $nTm^3/g$ in a magnetic field of 800 kA/m, measured in each case using a vibrating sample magnetometer.

Furthermore, the pigments can be readily dispersed. The pH of the pigments is from 7 to 10, in particular from 7.5 to 9, and the conductivity is from 30 to 350, in particular from 80 to 160 $\mu S/cm$.

After the novel pigments have been stored for one week in a conditioned cabinet at 65° C. and 95% relative humidity, their magnetization is at least 115 $nTm^3/g$ in a magnetic field of 400 kA/m.

The novel ferromagnetic pigments can be used for the preparation of magnetic recording materials. For this purpose, the pigments if necessary together with fillers, can be dispersed in a manner known per se in a solution comprising a solvent, a binder and further additives, such as a lubricant and a dispersant, and applied to a nonmagnetic substrate. After orientation of the ferromagnetic pigments in a strong magnetic field, further processing can be carried out in a conventional manner, for example by removing the solvent and, if required, curing the binder with subsequent calendering.

The solvents used may be the usual ones, such as ethers, e.g. tetrahydrofuran or dioxane, ketones, e.g. methyl ethyl ketone or cyclohexanone, esters, e.g. ethyl acetate or hydrocarbons, e.g. alkanes or aromatics, or mixtures of these solvents.

Suitable binders are known to be polyurethanes, polyacrylates, polymethacrylates, polyamide, vinylpolymers, such as polystyrene, polyvinyl chloride, polyvinyl acetate, polyvinyl propionate or polyacrylonitrile, cellulose-containing binders, such as cellulose esters, in particular cellulose nitrates, cellulose acetate, cellulose triacetate, cellulose acetic propionate or cellulose acetobutyrate, phenoxy resins, epoxy resins or block polymers or copolymers of these compounds.

Carboxylic acids of 10 to 20 carbon atoms, in particular stearic acid and palmitic acid, or derivatives of caboxylic acids, such as their salts, esters and amides, are usually used as lubricants.

Cationic, nonionic or, preferably, anionic surfactants, such as carboxylates, sulfonates or phosphonates of hydrocarbons, in particular alkyl or aryl compounds, may be used as disperants in the usual manner.

Suitable fillers are the usual ones, such as inorganic and organic pigments, e.g. alumina, silica, carbon black, polyethylene and polypropylene.

The nonmagnetic and nonmagnetizable substrates used may be the conventional rigid and flexible substrates, in particular films of linear polyesters, such as polyethyleneterephthalate, in general in thicknesses of from 4 to 200 nm, in particular from 6 to 36 nm.

In the preparation of magnetic recording materials, the novel pigments may be used alone or as a mixture of other ferromagnetic materials. It is also possible to apply to the substrate a plurality of layers, at least one of which contains the novel pigment.

By using the novel pigments for the production of magnetic recording materials, magnetic recording materials having good abrasion resistance, little tendency to stick, uniform running behavior, a high signal/noise ratio, a smooth layer surface and high output level are obtained.

EXAMPLES

The invention is illustrated by way of example below without any intention to restrict the invention to the examples.

For the characterization of the metal particles, the BET specific surface area SSA in [$m^2/g$] was measured according to DIN 66 132 with the aid of a Ströhlein areameter from Str öhlein, Düsseldorf, Germany, by the one-point difference method according to Haul and Dümbgen, and the magnetic values were determined. These were measured using a pulse magnetometer in a magnetic field of 400 kA/m, i.e. the coercive force Hc in [kA/m] at a tap density of 0.95 g/cm$^3$ and the specific remanent magnetization Mr/$\rho$ and specific magnetization Mm/$\rho$ in [$nTm^3/g$].

In addition, the switching field distribution SFD according to Williams and Comstock (AIP Conf. Proc. 5(1971), 738) was measured.

To test the stability of the materials, the latter were stored for one week at 65° C. and 95% relative humidity, and the magnetization was then measured again.

pH and conductivity of the pigments were determined according to European Standard EN-ISO 787-9 and EN-ISO 787-14.

The average dimensions of the particles were taken from electron micrographs (100,000:1).
Preparation of an Oxide Precursor Example 1

15.8 g of $Na_4P_2O_7.10\ H_2O$ were dissolved in 6 l of an aqueous iron(II) sulfate solution having a concentration of 0.9 mol/l. 1.5 l of an aqueous NaOH solution having a concentration of 4.32 mol/l (4.32 molar NaOH) were then added at 45° C. while stirring vigorously and passing through nitrogen, so that the resulting pH was 7.3.

An air/nitrogen gas mixture (volume ratio 60:40) was then passed in at 45° C. at a rate of 1000 l/h until the pH of the suspension was less than 4.

Air was then passed in at a rate of 1000 l/h at 70° C. until complete conversion of the iron(II) ions, and at the same time the pH of the suspension was brought to 5.4 with 4.32 molar NaOH.

Thereafter, the pH was brought to 8 with 4.32 molar NaOH, a solution of 114.4 g of $CoSO_4.7\ H_2O$ in 0.5 l of water was added dropwise in the course of 20 minutes while keeping the pH constant with 4.32 molar NaOH, and stirring was continued for 60 minutes.

A solution of 19.2 g of $Na_2SiO_3$ in 172.8 g of water was then added, with the result that the pH of the suspension increased to 9.

A solution of 21.6 g of $Al_2(SO_4)_3.18\ H_2O$ in 100 ml of water was then added, the pH being prevented from falling below 7 by adding 4.32 molar NaOH.

A solution of 73 g of $MgSO_4.7\ H_2O$ in 100 ml of water was then added and stirring was continued for 30 minutes.

Thereafter, the solid was filtered off and washed sulfate-free with water. The moist filter cake was molded into extrudates having a diameter of 4 mm and dried at 100° C.

The resulting particles having the properties shown in Table 1 were acicular and dendrite-free and had a uniform particle size distribution.

200 g of the particles were heated to 800° C. in nitrogen. The oxide particles obtained had a specific surface area of 42 $m^2/g$ (Table 1).

Example 2

The procedure was as in Example 1, except that the surface treatment was carried out at 35° C. with the amounts of cobalt shown in Table 1.

Examples 3–14

The procedure was as in Example 1, except that the compounds, amounts and process conditions shown in Table 1 were used.

Comparative Examples

The procedure was as in Example 1, except that the compounds, amounts and process conditions shown in Table 2 were used.

Comparative Example 1

The particle distribution was very nonuniform and the product had many dendrites.

Comparative Example 2

The FeOOH contained no cobalt.

Comparative Example 3

The FeOOH contained less than 5 mol of cobalt per 100 mol of the sum of iron and cobalt.

Comparative Example 4

The amount of silicon and aluminum was less than 4 mol per 100 mol of the sum of iron and cobalt. On heating, the particles exhibited pronounced agglomeration due to sintering. The specific surface area of the particles was only 29 $m^2/g$.

Comparative Example 5

The sum of the amounts of silicon and aluminum was greater than 13 mol per 100 mol of the sum of iron and cobalt.

Comparative Example 6

The molar ratio of silicon to aluminum was only 0.7.

Comparative Example 7

No treatment of magnesium was carried out. The filter cake exhibited thixotropic behavior. Molding to extrudates was not possible.

Comparative Example 8

Cobalt dissolved again. The filtrate had a strong pink color.

Comparative Example 9

The end product contained too much magnesium.

Comparative Example 10

The end product contained too much P.

Comparative Example 11

A very finely divided $Fe_2O_3$ was obtained. The specific surface area was 57 $m^2/g$.

Comparative Example 12

On heating, the particles exhibited pronounced agglomeration due to sintering. The specific surface area of the particles was only 27 $m^2/g$.

Preparation of Metal Pigments

Example 15

7 g of the particles obtained in Example 1 were reduced for 16 hours at 420° C. in a stream of 50 l/h of hydrogen. The water content of the waste gas was less than 0.02 $g/m^3$ at the end of the reaction.

After the particles had cooled, an air/nitrogen gas mixture (volume ratio 25:75) was passed over said particles at 70° C. at a rate of 40 l/h.

The novel pigments obtained had an average needle length of 170 nm and a ratio of average length to average width of 8:1. The properties of the pigments are summarized in Table 3.

Examples 16–29

The procedure was as in Example 15, except that the compounds and process conditions shown in Table 3 were used.

Example 30

125 g of the particles obtained in Example 1 were reduced for 16 hours at 440° C. in a fixed-bed reactor with a stream of 500 l/h of hydrogen. After the particles had cooled, they were treated at 80° C. with an air/nitrogen gas mixture (volume ratio: 40:60).

The properties of the pigments are summarized in Table 4.

Examples 31–34

The procedure was as in Example 30, except that the compounds and process conditions shown in Table 4 were used.

Comparative Examples

The procedure was as in Example 15, except that the compounds and process conditions shown in Table 5 were used.

Comparative Example 13

The coercive force of the pigments was only 76.5 kA/m.

Comparative Example 14

The magnetization of the pigments was only 127 $nTm^3/g$ in a magnetic field of 400 kA/m, and only 180 $nTm^3/g$ after the climatic test.

Comparative Example 15

The magnetization of the pigments was only 120 $nTm^3/g$ in a magnetic field of 400 kA/m, and only 104 $nTm^3/g$ after the climatic test.

Comparative Example 16

A product highly sintered by agglomeration was obtained. The coercive force of the pigments was only 103.6 kA/m.

Comparative Example 17

The magnetization of the pigments was only 132 $nTm^3/g$ in a magnetic field of 400 kA/m, and only 113 $nTm^3/g$ after the climatic test.

Comparative Example 18

The coercive force of the pigments was only 109.3 kA/m.

Comparative Example 19

The coercive force of the pigments was only 111.5 kA/m. The magnetization of the pigments was only 132 $nTm^3/g$ in a magnetic field of 400 kA/m, and only 110 $nTm^3/g$ after the climatic test.

Comparative Example 20

A product highly agglomerated by sintering was obtained. The coercive force of the pigments was only 111.5 kA/m.

Comparative Example 21

The magnetization of the pigments was only 130 $nTm^3/g$ in a magnetic field of 400 kA/m, and only 107 $nTm^3/g$ after the climatic test.

Comparative Example 22

The coercive force of the pigments was only 107.4 kA/m.

Comparative Example 23

The coercive force of the pigments was only 105.5 kA/m. The magnetization of the pigments was only 130 $nTm^3/g$ in a magnetic field of 400 kA/m, and only 103 $nTm^3/g$ after the climatic test.

TABLE 1

| | Preparation of goethite | | | | |
|---|---|---|---|---|---|
| | Preparation of goethite nuclei | | | | |
| | Amount of P [mol % of P based on Fe] | Type of phosphate | T [° C] | Air/$N_2$ ratio | Growth pH |
| Example 1 | 1.3 | $Na_4P_2O_7$ | 45 | 6/4 | 5.4 |
| Example 2 | 1.3 | $Na_4P_2O_7$ | 45 | 6/4 | 5.4 |
| Example 3 | 1.7 | $Na_4P_2O_7$ | 45 | 6/4 | 5.4 |
| Example 4 | 1.7 | $Na_4P_2O_7$ | 55 | 6/4 | 5.4 |
| Example 5 | 2.0 | $Na_4P_2O_7$ | 60 | 6/4 | 5.4 |
| Example 6 | 2.0 | $Na_4P_2O_7$ | 55 | 4/6 | 5.4 |
| Example 7 | 2.25 | $Na_4P_2O_7$ | 55 | 4/6 | 5.4 |
| Example 8 | 2.8 | $Na_4P_2O_7$ | 60 | 4/6 | 5.4 |
| Example 9 | 1.3 | $Na_4P_2O_7$ | 45 | 6/4 | 5.4 |
| Example 10 | 1.7 | $Na_4P_2O_7$ | 45 | 6/4 | 5.4 |
| Example 11 | 1.7 | $Na_4P_2O_7$ | 45 | 6/4 | 5.4 |
| Example 12 | 1.7 | $Na_4P_2O_7$ | 30 | 6/4 | 5.2 |
| Example 13 | 3.8 | $Na_4P_2O_7$ | 60 | 4/6 | 5.0 |
| Example 14 | 1.3 | $Na_4P_2O_7$ | 45 | 6/4 | 5.4 |

TABLE 1-continued

| | Surface coating/antithixotropic treatment | | | | | |
|---|---|---|---|---|---|---|
| | pH Co addition | Amount used [mol %, based on Fe] | | | | pH at the end |
| | | Co | Si | Al | Mg | |
| Example 1 | 8 | 7.6 | 5.9 | 1.3 | 5.5 | 7 |
| Example 2 | 8 | 12.1 | 5.9 | 1.3 | 5.5 | 7 |
| Example 3 | 8 | 7.6 | 5.9 | 1.3 | 5.5 | 7 |
| Example 4 | 8 | 7.6 | 5.9 | 1.3 | 5.5 | 7 |
| Example 5 | 8 | 7.6 | 5.9 | 1.3 | 5.5 | 7 |
| Example 6 | 8 | 7.6 | 5.9 | 1.3 | 5.5 | 7 |
| Example 7 | 8 | 7.6 | 5.9 | 1.3 | 5.5 | 7 |
| Example 8 | 8 | 7.6 | 5.9 | 1.3 | 5.5 | 7 |
| Example 9 | 8 | 7.6 | 5.6 | 1.7 | 5.5 | 7 |
| Example 10 | 8 | 7.6 | 5.3 | 2.6 | 5.5 | 7 |
| Example 11 | 8 | 7.6 | 4.4 | 3.3 | 5.5 | 7 |
| Example 12 | 8 | 7.6 | 6.2 | 1.7 | 5.5 | 7 |
| Example 13 | 8 | 13.6 | 8.9 | 2.3 | 5.5 | 7 |
| Example 14 | 8 | 7.6 | 5.9 | 1.2 | 5.5 | 7 |

| | Remarks | Preparation of hematite | |
|---|---|---|---|
| | | T [° C.] | SSA [m²/g] |
| Example 1 | Filter cake satisfactory | 800 | 42 |
| Example 2 | Filter cake satisfactory | 800 | 45 |
| Example 3 | Filter cake satisfactory | 800 | 47 |
| Example 4 | Filter cake satisfactory | 800 | 44 |
| Example 5 | Filter cake satisfactory | 800 | 43 |
| Example 6 | Filter cake satisfactory | 800 | 44 |
| Example 7 | Filter cake satisfactory | 800 | 43 |
| Example 8 | Filter cake satisfactory | 820 | 51 |
| Example 9 | Filter cake satisfactory | 820 | 45 |
| Example 10 | Filter cake satisfactory | 780 | 45 |
| Example 11 | Filter cake satisfactory | 800 | 43 |
| Example 12 | Filter cake satisfactory | 800 | 44 |
| Example 13 | Filter cake satisfactory | 800 | 64 |
| Example 14 | Filter cake satisfactory | 800 | 45 |

TABLE 2

| | Preparation of goethite | | | | |
|---|---|---|---|---|---|
| | Preparation of goethite nuclei | | | | |
| | Amount of P [mol % of P based on Fe] | Type of phosphate | T [° C.] | Air/N₂ ratio | Growth pH |
| Comparative Example 1 | — | — | 45 | 6/4 | 5.4 |
| Comparative Example 2 | 1.8 | Na₄P₂O₇ | 45 | 6/4 | 5.4 |
| Comparative Example 3 | 1.8 | Na₄P₂O₇ | 45 | 6/4 | 5.4 |
| Comparative Example 4 | 1.8 | Na₄P₂O₇ | 45 | 6/4 | 5.4 |
| Comparative Example 5 | 1.8 | Na₄P₂O₇ | 45 | 6/4 | 5.4 |
| Comparative Example 6 | 1.8 | Na₄P₂O₇ | 45 | 6/4 | 5.4 |
| Comparative Example 7 | 1.8 | Na₄P₂O₇ | 45 | 6/4 | 5.4 |
| Comparative Example 8 | 1.3 | Na₄P₂O₇ | 45 | 6/4 | 5.4 |
| Comparative Example 9 | 1.8 | Na₄P₂O₇ | 45 | 6/4 | 5.4 |
| Comparative Example 10 | 4.2 | Na₄P₂O₇ | 45 | 6/4 | 5.4 |
| Comparative Example 11 | 1.3 | Na₄P₂O₇ | 45 | 6/4 | 5.4 |
| Comparative Example 12 | 1.3 | Na₄P₂O₇ | 45 | 6/4 | 5.2 |

| | Surface coating/antithixotropic treatment | | | | | |
|---|---|---|---|---|---|---|
| | pH Co addition | Amount used [mol % based on Fe] | | | | pH at the end |
| | | Co | Si | Al | Mg | |
| Comparative Example 1 | 8 | 7.6 | 5.9 | 1.3 | 5.5 | 7 |
| Comparative Example 2 | 8 | — | 5.9 | 1.3 | 5.5 | 7 |
| Comparative Example 3 | 8 | 1.5 | 5.9 | 1.3 | 5.5 | 7 |
| Comparative Example 4 | 8 | 7.6 | 2.5 | 1.3 | 5.5 | 7 |
| Comparative Example 5 | 8 | 7.6 | 11.9 | 2.6 | 5.5 | 7 |
| Comparative Example 6 | 8 | 7.6 | 3.3 | 3.6 | 5.5 | 7 |
| Comparative Example 7 | 8 | 7.6 | 5.9 | 1.3 | — | 7 |
| Comparative Example 8 | 8 | 7.6 | 5.9 | 1.7 | 5.5 | 5,5 |
| Comparative Example 9 | 8 | 7.6 | 5.9 | 1.3 | 5.5 | 9 |
| Comparative Example 10 | 8 | 7.6 | 5.9 | 1.3 | 5.5 | 7 |
| Comparative Example 11 | 8 | 7.6 | 5.9 | 1.2 | 5.5 | 7 |
| Comparative Example 12 | 8 | 7.6 | 5.9 | 1.2 | 5.5 | 7 |

| | Remarks | Preparation of hematite | |
|---|---|---|---|
| | | T [° C.] | SSA [m²/g] |
| Comparative Example 1 | α-FeOOH with dendrites | 800 | 35 |
| Comparative Example 2 | without Co | 800 | 50 |
| Comparative Example 3 | insufficient Co | 800 | 46 |
| Comparative Example 4 | Si + Al insufficient | 800 | 29 |
| Comparative Example 5 | Si + Al in excess | 800 | 47 |
| Comparative Example 6 | more Al than Si | 800 | 39 |
| Comparative Example 7 | Filter cake thixotropic | — | — |
| Comparative Example 8 | Co lost | — | — |
| Comparative Example 9 | Mg remains in FeOOH | 800 | 50 |
| Comparative Example 10 | too much P | 800 | 46 |
| Comparative Example 11 | heated too low | 670 | 57 |
| Comparative Example 12 | heated too high | 900 | 27 |

TABLE 3

| No. | α-Fe$_2$O$_3$ No. | Red. Temp. [°C.] | Metal pigment Magnetic data | | | | | |
|---|---|---|---|---|---|---|---|---|
| | | | M$_m$/ρ [nTM$^3$/g] | M$_r$/ρ [nTM$^3$/g] | H$_c$ [kA/m] | SFD | SSA [m$^2$/g] | M$_m$/ρ* [nTM$^3$/g] |
| Example 15 | 1 | 420 | 145 | 79 | 118.1 | 0.50 | 49 | 123 |
| Example 16 | 2 | 440 | 146 | 80 | 117.9 | 0.51 | 49 | 126 |
| Example 17 | 3 | 440 | 149 | 83 | 126.0 | 0.48 | 51 | 121 |
| Example 18 | 4 | 440 | 158 | 88 | 128.0 | 0.49 | 46 | 126 |
| Example 19 | 5 | 440 | 168 | 96 | 139.1 | 0.47 | 45 | 129 |
| Example 20 | 6 | 440 | 161 | 93 | 142.7 | 0.45 | 49 | 124 |
| Example 21 | 7 | 440 | 143 | 83 | 140.4 | 0.49 | 46 | 120 |
| Example 22 | 8 | 460 | 142 | 84 | 136.5 | 0.50 | 48 | 121 |
| Example 23 | 9 | 440 | 144 | 78 | 115.3 | 0.50 | 54 | 123 |
| Example 24 | 10 | 460 | 144 | 78 | 120.9 | 0.53 | 50 | 123 |
| Example 25 | 11 | 480 | 146 | 81 | 120.8 | 0.53 | 46 | 129 |
| Example 26 | 12 | 440 | 152 | 87 | 123.9 | 0.55 | 44 | 129 |
| Example 27 | 13 | 480 | 140 | 79 | 119.0 | 0.62 | 61 | 116 |
| Example 28 | 14 | 440 | 147 | 82 | 121.4 | 0.50 | 48 | 123 |
| Example 29 | 14 | 400 | 153 | 83 | 117.0 | 0.52 | 50 | 122 |

| No. | Metal pigment | | | | | | | | Properties | |
|---|---|---|---|---|---|---|---|---|---|---|
| | Composition | | | | | | | | Length [nm] | Length/width ratio |
| | mol %, based on Fe + Co | | | | | | | | | |
| | Co | P | Al | Si | Na | Mg | Si + Al | Si/Al | | |
| Example 15 | 7.0 | 1.24 | 1.3 | 5.3 | 0.28 | 0.18 | 6.6 | 4.08 | 170 | 8:1 |
| Example 16 | 10.1 | 1.11 | 1.4 | 5.6 | 0.11 | 0.03 | 7.0 | 4.0 | 155 | 8:1 |
| Example 17 | 7.0 | 1.46 | 1.4 | 5.9 | 0.28 | 0.18 | 7.3 | 4.21 | 135 | 7:1 |
| Example 18 | 6.8 | 1.55 | 1.4 | 5.4 | 0.57 | 0.16 | 6.8 | 3.86 | 150 | 6:1 |
| Example 19 | 6.9 | 1.76 | 1.4 | 6.0 | 0.55 | 0.19 | 7.4 | 4.29 | 140 | 7:1 |
| Example 20 | 6.9 | 1.87 | 1.4 | 5.6 | 0.43 | 0.17 | 7.0 | 4.0 | 130 | 6:1 |
| Example 21 | 7.1 | 2.11 | 1.3 | 5.7 | 0.48 | 0.29 | 7.0 | 4.38 | 115 | 7:1 |
| Example 22 | 7.3 | 2.52 | 1.4 | 5.7 | 0.26 | 0.16 | 7.1 | 4.07 | 100 | 5:1 |
| Example 23 | 7.4 | 1.15 | 1.8 | 5.3 | 0.26 | 0.20 | 7.1 | 2.94 | 150 | 7:1 |
| Example 24 | 6.6 | 1.55 | 2.7 | 4.4 | 0.21 | 0.21 | 7.1 | 1.63 | 140 | 6:1 |
| Example 25 | 6.8 | 1.58 | 3.5 | 3.9 | 0.21 | 0.21 | 7.4 | 1.11 | 140 | 5:1 |
| Example 26 | 6.8 | 1.50 | 1.6 | 5.4 | 0.57 | 0.25 | 7.0 | 3.38 | 100 | 5:1 |
| Example 27 | 12.4 | 3.3 | 2.3 | 6.6 | 0.18 | 0.25 | 8.9 | 2.87 | 84 | 5:1 |
| Example 28 | 6.7 | 1.26 | 1.4 | 5.7 | 0.31 | 0.16 | 7.1 | 4.07 | 145 | 8:1 |
| Example 29 | 6.7 | 1.26 | 1.4 | 5.7 | 0.31 | 0.16 | 7.1 | 4.07 | 145 | 8:1 |

M$_m$/ρ*: Specific magnetization after storage for 1 week at 65° C. and 95% relative humidity.

TABLE 4

| No. | α-Fe$_2$O$_3$ No. | Red. Temp. [°C.] | Metal pigment Magnetic data | | | | | |
|---|---|---|---|---|---|---|---|---|
| | | | M$_m$/ρ [nTM$^3$/g] | M$_r$/ρ [nTM$^3$/g] | H$_c$ [kA/m] | SFD | SSA [m$^2$/g] | M$_m$/ρ* [nTM$^3$/g] |
| Example 30 | 1 | 440 | 148 | 81 | 115.2 | 0.48 | 47 | 125 |
| Example 31 | 11 | 480 | 149 | 83 | 121.6 | 0.52 | 50 | 127 |
| Example 32 | 3 | 440 | 158 | 89 | 127.3 | 0.50 | 46 | 124 |
| Example 33 | 4 | 440 | 148 | 82 | 131.4 | 0.53 | 47 | 126 |
| Example 34 | 5 | 440 | 146 | 83 | 137.4 | 0.50 | 48 | 122 |

| No. | Metal pigment | | | | | | | | Properties | | | |
|---|---|---|---|---|---|---|---|---|---|---|---|---|
| | Composition | | | | | | | | Length [nm] | Length/width ratio | pH | Λ [μS/cm] |
| | mol %, based on Fe + Co | | | | | | | | | | | |
| | Co | P | Al | Si | Na | Mg | Si + Al | Si/Al | | | | |
| Example 30 | 7.0 | 1.24 | 1.3 | 5.3 | 0.28 | 0.18 | 6.6 | 4.08 | 170 | 8:1 | 8.6 | 122 |
| Example 31 | 6.8 | 1.58 | 3.5 | 3.9 | 0.21 | 0.21 | 7.4 | 1.11 | 140 | 5:1 | 8.2 | 107 |
| Example 32 | 6.8 | 1.55 | 1.4 | 5.4 | 0.57 | 0.16 | 6.8 | 3.86 | 150 | 6:1 | 8.5 | 117 |
| Example 33 | 6.9 | 1.76 | 1.4 | 6.0 | 0.55 | 0.19 | 7.4 | 4.29 | 140 | 7:1 | 9.1 | 303 |
| Example 34 | 6.9 | 1.87 | 1.4 | 5.6 | 0.43 | 0.17 | 7.0 | 4.0 | 130 | 6:1 | 8.9 | 200 |

TABLE 5

| No. | α-Fe₂O₃ No. | Red. Temp. [°C.] | Metal pigment Magnetic data | | | | | |
|---|---|---|---|---|---|---|---|---|
| | | | $M_m/\rho$ [nTM³/g] | $M_r/\rho$ [nTM³/g] | $H_c$ [kA/m] | SFD | SSA [m²/g] | $M_m/\rho^*$ [nTM³/g] |
| Comparative Example 13 | Comparative Example 1 | 440 | 167 | 79 | 76.5 | 0.64 | 41 | 155 |
| Comparative Example 14 | Comparative Example 2 | 440 | 127 | 69 | 122.4 | 0.43 | 44 | 108 |
| Comparative Example 15 | Comparative Example 3 | 440 | 120 | 66 | 124.0 | 0.48 | 45 | 104 |
| Comparative Example 16 | Comparative Example 4 | 440 | 158 | 84 | 105.1 | 0.60 | 29 | 147 |
| Comparative Example 17 | Comparative Example 5 | 440 | 132 | 72 | 122 | 0.54 | 56 | 113 |
| Comparative Example 18 | Comparative Example 6 | 440 | 150 | 81 | 109.3 | 0.54 | 46 | 127 |
| Comparative Example 19 | Comparative Example 9 | 440 | 132 | 72 | 111.5 | 0.56 | 59 | 110 |
| Comparative Example 20 | Comparative Example 10 | 440 | 156 | 88 | 111.5 | 0.53 | 51 | 132 |
| Comparative Example 21 | Comparative Example 11 | 440 | 130 | 71 | 119.7 | 0.50 | 50 | 107 |
| Comparative Example 22 | Example 14 | 440 | 133 | 71 | 107.4 | 0.60 | 54 | 107 |
| Comparative Example 23 | Example 14 | 350 | 130 | 69 | 105.5 | 0.62 | 54 | 103 |

| | Metal pigment | | | | | | | | | |
|---|---|---|---|---|---|---|---|---|---|---|
| | Composition | | | | | | | Properties | | |
| | mol % based on Fe + Co | | | | | | | Length | Length/ | |
| No. | Co | P | Al | Si | Na | Mg | Si + Al | Si/Al | [nm] | width ratio | Remarks |
| Comparative Example 13 | 7.3 | — | 1.4 | 5.6 | 0.43 | 0.16 | 7.0 | 4.0 | 350 | 9:1 | many agglomerates |
| Comparative Example 14 | — | 1.51 | 1.4 | 4.9 | 0.72 | 0.52 | 6.3 | 3.50 | 150 | 6:1 | |
| Comparative Example 15 | 1.4 | 1.50 | 1.3 | 4.9 | 0.69 | 0.36 | 6.3 | 3.77 | 150 | 8:1 | |
| Comparative Example 16 | 7.1 | 1.58 | 1.5 | 2.2 | 0.38 | 0.08 | 3.7 | 1.46 | 130 | 4:1 | pronounced agglomeration due to sintering |
| Comparative Example 17 | 6.6 | 1.47 | 2.8 | 10.5 | 1.49 | 0.27 | 13.3 | 3.75 | 140 | 9:1 | |
| Comparative Example 18 | 6.9 | 1.55 | 4.1 | 2.9 | 0.26 | 0.16 | 7.0 | 0.71 | 100 | 5:1 | |
| Comparative Example 19 | 7.4 | 1.55 | 1.5 | 5.9 | 0.18 | 5.1 | 7.4 | 3.93 | 120 | 8:1 | |
| Comparative Example 20 | 7.1 | 3.7 | 2.0 | 7.8 | 0.76 | 1.0 | 9.6 | 3.9 | 90 | 3:1 | |
| Comparative Example 21 | 6.7 | 1.26 | 1.4 | 5.7 | 0.31 | 0.16 | 7.1 | 4.07 | 145 | 8:1 | |
| Comparative Example 22 | 6.7 | 1.26 | 1.4 | 5.7 | 0.31 | 0.16 | 7.1 | 4.07 | 145 | 8:1 | |
| Comparative Example 23 | 6.7 | 1.26 | 1.4 | 5.7 | 0.31 | 0.16 | 7.1 | 4.07 | 145 | 8:1 | |

We claim:

1. An acicular, ferromagnetic, iron- and cobalt-containing pigment, comprising
    a) from 30 to 70 vol % of a core which comprises essentially cobolt and iron and
    b) from 30 to 70 vol % of a shell which comprises essentially aluminum, silicon, magnesium, phosphorus and oxygen, and containing
        from 5 to 20 mol of cobalt,
        from 1 to 5 mol of aluminum,
        from 3 to 10 mol of silicon,
        from 0.7 to 3.5 mol of phosphorus,
        less than 1 mol of magnesium, and oxygen,
per 100 mol of the molar sum of iron and cobalt, the sum of the amounts per weight of the elements iron, cobalt, aluminum, silicon, phosphorus and oxygen being from 95 to 100% by weight, based on the total weight of the pigment.

2. A pigment as claimed in claim 1, wherein the molar ratio of silicon to aluminum is at least 1.

3. A pigment as claimed in claim 1, wherein the molar sum of aluminum and silicon is from 4 to 13 mol per 100 mol of the molar sum of iron and cobalt.

4. A pigment as claimed in claim 1, containing at least one alkali metal.

5. A pigment as claimed in claim 4, containing from 0.02 to 1 mol of sodium per mol of the molar sum of iron and cobalt.

6. A pigment as claimed in claim 1, containing manganese or yttrium.

7. A pigment as claimed in claim 1, containing lanthanum or at least one element from the lanthanide series.

8. A pigment as claimed in claim 1, containing lanthanum or neodymium.

9. A pigment as claimed in claim 1, which is acicular and has an average length of from 50 to 195 nm and a ratio of length to average needle width of from 3:1 to 9:1.

10. A pigment as claimed in claim 1, having a coercive force Hc of more than 115 kA/m, measured at a tap density of 0.95 g/cm³.

11. A pigment as claimed in claim 1, having a magnetization Mm of at least 135 nTm³/g at a field strength of 400 kA/m.

12. A pigment as claimed in claim 1, having a pH according to EN-ISO 787-9 of from 7 to 10.

13. A pigment as claimed in claim 1, having a conductivity according to EN-ISO 787-14 of from 30 to 350 μS/cm.

14. A process for the preparation of a pigment as claimed in claim 1, wherein
    a) a solution containing iron(II) ions is reacted in the presence of phosphate ions with a substoichiometric amount of a basic alkali metal compound to give iron(II) hydroxide,
    b) the iron(II) hydroxide is oxidized to α-FeOOH until the pH falls below 4,
    c) the iron(II) ions still remaining in solution are oxidized to α-FeOOH, the pH being prevented from falling below 4 by means of a basic alkali metal compound,
    d) a solution containing cobalt(II) ions is added at a pH of from 7 to 10,
    e) an alkali metal silicate solution is added,
    f) a solution containing aluminum ions is added at a pH of from 6 to 10, g) a solution containing magnesium ions is added at a pH of from 6 to 8, and h) the precipitate is separated off, extruded, dried, heated at 700 to 850° C., reduced at from 380 to 520° C. with hydrogen and then passivated with a gas containing molecular oxygen.

15. A process as claimed in claim 14, wherein at least one of the compounds added in the steps a, d, f and g is a salt of sulfuric acid.

16. A process as claimed in claim 14, wherein at least one manganese, yttrium, lanthanum or neodymium compound is added in at least one of the steps a) to f).

17. A process for the production of magnetic recording materials, comprising a) dispersing the pigment as claimed in claim 1 in a solution containing a solvent, a binder, fillers, a lubricant and a dispersant;

b) applying said solution to a nonmagnetic substrate;

c) orienting said pigments in a strong magnetic field;

d) removing the solvent;

e) curing the binder; and f) subsequent calendering.

18. A magnetic recording material containing a pigment as claimed in claim 1.

* * * * *